United States Patent
Watanabe et al.

(10) Patent No.: US 11,001,714 B2
(45) Date of Patent: May 11, 2021

(54) PRODUCTION METHOD FOR ELECTRONIC MATERIAL FILLER AND PRODUCTION METHOD FOR ELECTRONIC MATERIAL RESIN COMPOSITION

(71) Applicant: ADMATECHS CO., LTD., Miyoshi (JP)

(72) Inventors: Yusuke Watanabe, Miyoshi (JP); Nobutaka Tomita, Miyoshi (JP); Yoshiaki Kato, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

(21) Appl. No.: 16/715,185

(22) Filed: Dec. 16, 2019

(65) Prior Publication Data
US 2020/0189922 A1 Jun. 18, 2020

(30) Foreign Application Priority Data
Dec. 17, 2018 (JP) .............................. JP2018-235932

(51) Int. Cl.
| | |
|---|---|
| C09C 3/12 | (2006.01) |
| C01B 33/18 | (2006.01) |
| C08J 3/205 | (2006.01) |
| C08K 9/06 | (2006.01) |
| C08J 3/20 | (2006.01) |

(52) U.S. Cl.
CPC .............. *C09C 3/12* (2013.01); *C01B 33/181* (2013.01); *C08J 3/203* (2013.01); *C08J 3/2053* (2013.01); *C08K 9/06* (2013.01); *C01P 2004/62* (2013.01); *C01P 2004/64* (2013.01); *C01P 2006/12* (2013.01); *C01P 2006/40* (2013.01)

(58) Field of Classification Search
CPC .......... C09C 3/12; C09C 1/3081; C08J 3/203; C08J 3/2053; C01B 33/181; C08K 9/06; C08K 3/36; C01P 2006/40; C01P 2004/64; C01P 2004/62; C01P 2006/12; C01P 2006/82
See application file for complete search history.

(56) References Cited

U.S. PATENT DOCUMENTS

| | | | | |
|---|---|---|---|---|
| 5,376,172 A * | 12/1994 | Tripp | ..................... | B82Y 30/00 106/490 |
| 5,623,028 A * | 4/1997 | Fitzgerald | ........... | C08F 290/148 523/212 |
| 6,455,613 B1 * | 9/2002 | Zimmer | ................. | B60C 1/0016 523/213 |
| 2004/0101688 A1 * | 5/2004 | Rubinsztajn | ............. | C08L 63/00 428/413 |
| 2006/0150527 A1 * | 7/2006 | Ohara | ..................... | B82Y 30/00 51/308 |
| 2015/0079512 A1 * | 3/2015 | Sanchez Garcia | ..... | C08G 77/38 430/108.3 |

FOREIGN PATENT DOCUMENTS

| | | |
|---|---|---|
| CN | 101195487 A | 6/2008 |
| EP | 3 608 292 A1 | 2/2020 |
| JP | S58-138740 A | 8/1983 |
| JP | S60-199020 A | 10/1985 |
| JP | 10-297915 A | 11/1998 |
| JP | 2005-171208 A | 6/2005 |
| JP | 2005-298740 A | 10/2005 |
| JP | 2006-256913 A | 9/2006 |
| JP | 2006-290724 A | 10/2006 |
| JP | 2008-50207 A | 3/2008 |
| JP | 2008-074668 A | 4/2008 |
| JP | 2010-228997 A | 10/2010 |
| JP | 2011-068526 A | 4/2011 |
| JP | 2014-196226 A | 10/2014 |
| JP | 2015013788 A * | 1/2015 |
| TW | 201740392 A | 11/2017 |
| WO | WO 2018/186468 A1 | 10/2018 |

OTHER PUBLICATIONS

Opposition to Grant of Patent issued Mar. 18, 2020 in Japanese Patent Application No. 2018-235932 (with unedited computer generated English translation), 46 pages.
Notice of Reason for Revocation dated May 18, 2020 in Japanese Patent Application No. 2018-235932 (with unedited computer generated English translation), 27 pages.
Combined Taiwanese Office Action and Search Report dated Apr. 15, 2020 in Taiwanese Patent Application No. 108139184 (with unedited computer generated English translation), 15 pages.
"Test methods for water content of chemical products", Apr. 20, 2001, JIS, 8 pages (with partial unedited computer generated English translation).
"Mannual for Karl Fischer Reagents by Mitsubishi Chemical", Jul. 1, 1998, Mitsubishi Chemical Corporation, pp. 129, 130, 200, 201 with cover page (with partial unedited computer generated English translation).
Chikazawa, M., et al., "Surface Chemistry of Powder Particles and Adhesion Phenomenon", Bulletin of the Society of Salt Science, Japan, 1987, vol. 41, Issue 4, pp. 168-180 (with partial unedited computer generated English translation).
Goto, K., et al., "Dielectric properties of fillers for the epoxy resin molding compound at humidity", Japanese Journal of Polymer Science and Technology, 1985, vol. 42, Issue 9, pp. 559-565 (with partial unedited computer generated English translation).

(Continued)

*Primary Examiner* — Anthony J Zimmer
(74) *Attorney, Agent, or Firm* — Oblon, McClelland, Maier & Neustadt, L.L.P.

(57) ABSTRACT

A production method for an electronic material filler includes: a preparation step of preparing a silica particle material produced by a dry method; and a first surface treatment step of performing surface treatment on the silica particle material with a silane compound having a vinyl group, a phenyl group, a phenylamino group, an alkyl group having four or more carbon atoms, a methacryl group, or an epoxy group, to obtain a first surface treatment-processed particle material. After the silica particle material is produced by the dry method, the silica particle material is not brought into contact with liquid water, and has a particle diameter of 100 nm to 600 nm or a specific surface area of 5 m²/g to 35 m²/g.

10 Claims, No Drawings

(56) References Cited

OTHER PUBLICATIONS

"Water vapor adsorption characteristics of heat-treated fine powder silica", Bulletin of the Chemical Society of Japan, 1965, vol. 86, Issue 12, pp. 1241-1244 (with partial unedited computer generated English translation).

Naono, H., "Characterization of Powder by Adsorption of Nitrogen Gas and Water Vapor", Journal of the Research Association of Powder Technology, Japan, 1991, vol. 28, Issue 1, pp. 34-39 (with partial unedited computer generated English translation).

"Determination of the specific surface area of powders (solids) by gas adsorption", Jan. 21, 2013, JIS Z 8830, pp. 1 and 5 with cover page (with partial unedited computer generated English translation).

"Anomalous surface concentration of silanol groups on the surface of finely divided silica", Bulletin of the Chemical Society of Japan, 1965, vol. 86, Issue 3, pp. 294-296 (with partial unedited computer generated English translation).

Korean Office Action dated Mar. 13, 2020, in Korean Patent Application No. 10-2019-0141665 (with English Translation).

M. Chikazawa et al. "Surface Chemistry of Powder Particles and Adhesion Phenomenon", Bulletin of the Society of Sea Water Science, Japan, 1987, vol. 41, Issue 4, pp. 168-180 (w/ Excerpt computer-generated English translation).

Notification of Reasons for Refusal dated Mar. 28, 2019, in Japanese Patent Application No. 2018-235932 (w/ Computer-generated English translation).

Decision to Grant dated Jul. 18, 2019, in Japanese Patent Application No. 2018-235932 (w/ Computer-generated English translation).

Combined Chinese Office Action and Search Report dated Sep. 3, 2020 in Patent Application No. 201911126702.3 (with partial English language translation), 14 pages.

Japanese Office Action (Decision on Opposition) dated Jan. 6, 2021, in Japanese Patent Application No. 2018-235932 (with English Translation).

\* cited by examiner

PRODUCTION METHOD FOR ELECTRONIC MATERIAL FILLER AND PRODUCTION METHOD FOR ELECTRONIC MATERIAL RESIN COMPOSITION

CROSS REFERENCE TO RELATED APPLICATIONS

The present invention is based on Japanese application No. 2018-235932, filed on. Dec. 17, 2018, the entire contents of which are incorporated herein by reference.

TECHNICAL FIELD

The present invention relates to an electronic material filler and a production method therefor, a production method for an electronic material resin composition, a high-frequency substrate, and an electronic material slurry.

BACKGROUND ART

An electronic material filler made of a metal oxide particle material has been used as sealing materials for semiconductor devices, substrate materials, and other electronic materials, and a resin composition obtained by dispersing the electronic material filler in a resin material has been especially known (JP-S58-138740 (A), JP-S60-199020 (A), etc.).

Meanwhile, JP-S60-199020(A) indicates that, when a resin composition obtained by dispersing a metal oxide particle material in a resin material is applied to an electronic material, a preferable result of a pressure cooker test is obtained by setting the amount of physically adsorbed water in the metal oxide particle material to be dispersed to 50 ppm or less. If silica is heated to a temperature higher than 200° C., surface OH groups (bound water) begin to be removed (see, for example, Surface Chemistry of Powder Particles and Adhesion Phenomenon, Masatoshi CHIKAZAWA and Takashi TAKEI, Bulletin of the Society of Sea Water Science, Japan, 1987, Vol. 41, No. 4, p.168-180). Thus, the physically adsorbed water of silica is measured by heating to 200° C.

SUMMARY OF INVENTION

Technical Problem

The present inventors have obtained the finding that electric characteristics (for example, dielectric loss tangent: Df) are improved by reducing the amount of contained water (bound water, etc.) in addition to the amount of physically adsorbed water in applying a metal oxide particle material to an electronic material filler.

Here, in the invention disclosed in JP-S60-199020(A), use of particles having a relatively large particle diameter is assumed as defined in claim 1 that the particle diameter is 20 to 100 µm. In recent years, electronic material fillers have become smaller in particle diameter from submicron to nanometer order with the miniaturization of semiconductor device structures and circuits. The amount of physically adsorbed water increases in proportion to the surface area of a particle material. Thus, the smaller the particle diameter is, the larger the surface area and the amount of physically adsorbed water are. For example, in the case of a particle material whose particle diameter is decreased from submicron to nanometer order, the amount of water which is equivalent to an "amount of water of 50 ppm or less" as defined in JP-S60-199020 (A) is increased by several tens of times and exceeds 1000 ppm. Even if heating is performed for the purpose of reducing the amount of water by targeting said amount of water, the amount of contained water (bound water, etc.) cannot be expected to be reduced to such an extent that improvement of electric characteristics is achieved, and sufficient electric characteristics are not achieved. In particular, even if the amount of physically adsorbed water is reduced, moisture in the air is sometimes quickly recombined thereafter.

An object of the present invention is to provide an electronic material filler having excellent electric characteristics by reducing the amount of contained water other than physically adsorbed water, a production method therefor, a production method for an electronic material resin composition, a high-frequency substrate, and an electronic material slurry.

Solution to Problem (1) A production method for an electronic material filler according to the present invention solving the above-described problem includes:

a preparation step of preparing a silica particle material produced by a dry method; and a first surface treatment step of performing surface treatment on the silica particle material with a silane compound having a vinyl group, a phenyl group, a phenylamino group, an alkyl group having four or more carbon atoms, a methacryl group, or an epoxy group, to obtain a first surface treatment-processed particle material, and after the silica particle material is produced by the dry method, the silica particle material is not brought into contact with liquid water, and has a particle diameter of 100 nm to 2000 nm or a specific surface area of 2 $m^2/g$ to 35 $m^2/g$.

By using the silica particle material produced by the dry method and not bringing the silica particle material into contact with water in a subsequent step, the amount of water contained in the silica particle material forming an electronic material filler is reduced, and thus electric characteristics such as a Df value are improved. In particular, the particle diameter is preferably 600 nm or less, and the specific surface area is preferably 5 $m^2/g$ or greater.

The invention of (1) described above may have at least one of the following features (2) and (3).

(2) The production method includes a second surface treatment step of performing surface treatment on the first surface treatment-processed particle material with organosilazane, to obtain a second surface treatment-processed particle material, and an amount of the organosilazane used in the second surface treatment step is equal to or greater than an amount of functional groups that remain on a surface of the first surface treatment-processed particle material and that are capable of reacting with the organosilazane, and is an amount that does not substantially leave OH groups on the surface.

(3) The preparation step includes a drying step of, after the silica particle material is produced by a dry method, heating and drying the silica such that an amount of water produced when heated at 200° C. is 40 ppm or less per 1 $m^2$ of surface area. This feature is based on the finding that the value of a dielectric loss tangent is lower when the amount of water produced when heated at 200° C. is 40 ppm or less.

In the present specification, measurement of an amount of water produced when heated at a predetermined temperature (for example, 200° C. or 500° C.) is performed by measuring an amount of water produced when heated to the predetermined temperature, using the Karl Fischer method. The amount of physically adsorbed water is desorbed and measured by heating at 200° C.

By heating at a temperature higher than 200° C. (for example, at 300° C.), bound water is also removed in addition to physically adsorbed water. If bound water exists, the amount of physically adsorbed water easily increases. Thus, by reducing bound water, the amount of physically adsorbed water is reduced. Even if the amount of water exceeds 40 ppm, the value of the dielectric loss tangent is not excessively high in some cases, and electric characteristics such as the dielectric loss tangent are relatively improved by reducing the amount of water.

(4) A production method for an electronic material filler according to the present invention solving the above-described problem includes:

a silica particle material production step of producing a silica particle material by a dry method; and a drying step of heating and drying the silica particle material such that an amount of water produced when heated at 200° C. is 40 ppm or less per 1 $m^2$ of surface area, to obtain a dried silica particle material, wherein after the silica particle material is produced by the dry method, the silica particle material is not brought into contact with liquid water, and has a particle diameter of 100 nm to 2000 nm or a specific surface area of 2 $m^2$/g to 35 $m^2$/g.

The electric characteristics are improved by controlling not only physically adsorbed water that is physically adsorbed on the surface of the silica particle material, but also the amount of water contained other than the physically adsorbed water. In particular, the particle diameter is preferably 600 nm or less, and the specific surface area is preferably 5 $m^2$/g or greater.

The invention of (3) or (4) described above may have the following feature (5).

(5) The drying step is a step of performing heating and drying such that an amount of water produced when heated at 500° C. is 70 ppm or less per 1 $m^2$ of surface area. More firmly bound water is produced by heating to a temperature that exceeds 200° C. and that is equal to or higher than 500° C. Since it becomes clear that even such water has an influence on electric characteristics, the contained amount of such water is specified.

(6) A production method for an electronic material resin composition according to the present invention solving the above-described problem includes:

a step of producing an electronic material filler by the above-described production method for an electronic material filler; and a mixing/dispersing step of mixing and dispersing the electronic material filler in a resin material without bringing the electronic material filler into contact with liquid water. The resin material to be used preferably has a contained amount of water of 1000 ppm or less.

(7) An electronic material filler according to the present invention solving the above-described problem is a silica particle material that has a particle diameter of 100 nm to 2000 nm or a specific surface area of 2 $m^2$/g to 35 $m^2$/g, and an amount of water, produced when heated at 200° C., of 40 ppm or less per 1 $m^2$ of surface area, and is subjected to surface treatment with a silane compound having a vinyl group, a phenyl group, a phenylamino group, an alkyl group having four or more carbon atoms, a methacryl group, or an epoxy group. In particular, the particle diameter is preferably 600 nm or less, and the specific surface area is preferably 5 $m^2$/g or greater.

(8) An electronic material filler according to the present invention solving the above-described problem is a silica particle material that has a particle diameter of 100 nm to 2000 nm or a specific surface area of 2 $m^2$/g to 35 $m^2$/g, has an amount of water, produced when heated at 200° C., of 40 ppm or less per 1 $m^2$ of surface area, and has a functional group represented by formula (A): —OSiX$^1$X$^2$X$^3$ and a functional group represented by formula (B): —OSiY$^1$Y$^2$Y$^3$ on a surface thereof, and does not substantially have an OH group on the surface thereof. In particular, the particle diameter is preferably 600 nm or less, and the specific surface area is preferably 5 $m^2$/g or greater. In the formulas (A) and (B): X$^1$ represents a vinyl group, a phenyl group, a phenylamino group, an alkyl group having four or more carbon atoms, a methacryl group, of an epoxy group; X$^2$ and X$^3$ are each independently selected from —OSiR3 and —OSiY$^4$Y$^5$Y$^6$; Y$^1$ represents R; Y$^2$ and Y$^3$ are each independently selected from R and —OSiY$^4$Y$^5$Y$^6$; Y$^4$ represents R; Y$^5$ and Y$^6$ are each independently selected from R and —OSiR3; Rs are each independently selected from alkyl groups having one to three carbon atoms; and any of X$^2$, X$^3$, Y$^2$, Y$^3$, Y$^5$, and Y$^6$ may be bonded to any of X$^2$, X$^3$, Y$^2$, Y$^3$, Y$^5$, and Y$^6$ of an adjacent functional group via —O—.

(9) A high-frequency substrate according to the present invention solving the above-described problem includes the above-described electronic material filler and a resin material in which the electronic material filler is dispersed. Since the above-described electronic material filler has a low Df value, the dielectric loss tangent becomes small, and the loss of power is suppressed by using the electronic material filler for a substrate that handles high frequencies such as a high frequency signal. In particular, the resin material preferably has a contained amount of water of 1000 ppm or less.

(10) An electronic material slurry according to the present invention solving the above-described problem includes the above-described electronic material filler and a liquid dispersion medium in which the electronic material filler is dispersed and which does not substantially contain water.

The production method for an electronic material filler according to the present invention provides an electronic material filler that has excellent electric characteristics such as a Df value by having the above configuration.

DESCRIPTION OF EMBODIMENTS

The electronic material filler and the production method therefor, the production method for the electronic material resin composition, the high-frequency substrate, and the electronic material slurry according to the present invention are described in detail below based on an embodiment.

(Electronic Material Filler)

An electronic material filler according to the present embodiment may be used as materials such as sealing materials for electronic components, substrate materials, and heat transfer materials. In particular, the electronic material filler according to the present embodiment is preferably used for a later-described electronic material resin composition.

The electronic material filler according to the present embodiment is a silica particle material having a particle diameter of 100 nm to 2000 nm or a specific surface area of 2 $m^2$/g to 35 $m^2$/g. The electronic material filler has an amount of water, produced when heated at 200° C., of 40 ppm or less per 1 m² of surface area.

As for the particle diameter, 150 nm may be adopted as a lower limit, and 1000 nm, 800 nm, 600 nm, and 500 nm may be adopted as an upper limit. These upper and lower limits may be used in any combination. The particle diameter may be measured by a general method such as a dynamic scattering method.

As for the specific surface area, 3 m²/g, 5 m²/g, and 10 m²/g may be adopted as a lower limit, and 30 m²/g may be adopted as an upper limit. These upper and lower limits may be used in any combination. A measurement of the specific surface area is a value measured by the BET method using nitrogen.

The particle diameter and the specific surface area are correlated with each other, and the specific surface area tends to be larger when the particle diameter is smaller. If the particle diameter (specific surface area) is set to the lower limit or greater (the upper limit or less), good fluidity is achieved when the electronic material filler is added into a resin. If the particle diameter (specific surface area) is set to the upper limit or less (the lower limit or greater), good stability is achieved when the electronic material filler is used for a slurry composition.

The amount of water produced at 200° C. (hereinafter, referred to as "produced water amount 200° C.") is measured by the Karl Fischer method as described above. The produced water amount 200° C. is the amount of water produced with a temperature increase from normal temperature (25° C.) to 200° C.

As a value of the produced water amount 200° C., an amount of water (ppm) contained per mass of the electronic material filler is calculated. For a certain electronic material filler, a value of the produced water amount 200° C. per 1 m² of surface area is calculated by dividing the value of the produced water amount 200° C. by the specific surface area (m²/g). The upper limit of the value of the produced water amount 200° C. per 1 m² of surface area is, for example, 40 ppm.

The value of the produced water amount 200° C. per 1 m² of surface area is preferably as low as possible. If the value of the produced water amount 200° C. is low, the value of a dielectric loss tangent is low. However, even if the value of the dielectric loss tangent is low, the value of the produced water amount 200° C. per 1 m² of surface area does not necessarily need to be low. A method for adjusting the produced water amount 200° C. is described later.

Moreover, the amount of water produced at 500° C. (hereinafter, referred to as "produced water amount 500° C.") is a value calculated when the heating temperature is changed from 200° C. to 500° C. in the method for measuring the value of the produced water amount 200° C. The value of the produced water amount 500° C. per 1 m² of surface area may also be calculated by the same method as the calculation method for the value of the produced water amount 200° C. per 1 m² of surface area, except for the heating temperature. The upper limit of the value of the produced water amount 500° C. per 1 m² of surface area is preferably 70 ppm. The produced water amount 500° C. per 1 m² of surface area is also preferably as low as possible.

The electronic material filler according to the present embodiment has at least either one of the following features (1) and (2).

(1) The electronic material filler is subjected to surface treatment with a silane compound having a vinyl group, a phenyl group, a phenylamino group, an alkyl group having four or more carbon atoms, a methacryl group, or an epoxy group. Particularly, the electronic material filler is preferably subjected to surface treatment with a silane compound having a vinyl group, a phenyl group, or an alkyl group having four or more carbon atoms. The amount of the silane compound used for the surface treatment is not particularly limited, but is preferably an amount that allows all OH groups present on the surface of the silica particle material before the surface treatment to be eliminated. Infiltration of water into the silica particle material is inhibited by performing the surface treatment with the silane compound having one of these functional groups.

The surface treatment with the silane compound is performed by bringing a surface treatment agent containing the silane compound (for example, a solution obtained by dissolving the silane compound in a solvent) into contact with the surface of the silica particle material. The surface treatment is performed without using water. Here, the term "without using water" means that the amount of water contained in the surface treatment agent containing the silane compound is set to 1000 ppm or less. The details are described later.

(2) The electronic material filler has a functional group represented by formula (A): —OSiX$^1$X$^2$X$^3$ and a functional group represented by formula (B): —OSiY$^1$Y$^2$Y$^3$ on the surface thereof, and does not substantially have an OH group on the surface thereof. In the formulas (A) and (B): X$^1$ represents a vinyl group, a phenyl group, a phenylamino group, an alkyl group having four or more carbon atoms, a methacryl group, or an epoxy group; X$^2$ and X$^3$ are each independently selected from —OSiR3 and —OSiY$^4$Y$^5$Y$^6$; Y$^1$ represents R; Y$^2$ and Y$^3$ are each independently selected from R and —OSiY$^4$Y$^5$Y$^6$; Y$^4$ represents R; Y$^5$ and Y$^6$ are each independently selected from R and —OSiR3; Rs are each independently selected from alkyl groups having one to three carbon atoms; and any of X$^2$, X$^3$, Y$^2$, Y$^3$, Y$^5$, and Y$^6$ may be bonded to any of X$^2$, X$^3$, Y$^2$, Y$^3$, Y$^5$, and Y$^6$ of an adjacent functional group via —O—.

The functional groups are functional groups that can be introduced by the surface treatment in (1) described above, or the like. Since these functional groups exist, infiltration of water into the silica particle material is inhibited.

(Production Method for Electronic Material Filler: Part 1)

A production method for an electronic material filler according to the present embodiment includes a preparation step, a first surface treatment step, and other necessary steps. The production method for an electronic material filler according to the present embodiment is a method that is suitably used for production of the above-described electronic material filler according to the present embodiment. The produced electronic material filler has a particle diameter or a specific surface area that is equal to that of the above-described electronic material filler according to the present embodiment. If the particle diameter of a silica particle material produced in the preparation step described later is decreased, the particle diameter of the electronic material filler is decreased, and the specific surface area of the electronic material filler is increased (if the amount of a silane compound to be reacted in the first surface treatment step described later is increased, the particle diameter is increased and the specific surface area is decreased).

Preparation Step

The preparation step is a step of preparing a silica particle material by a dry method. The dry method is a method for forming a silica particle material without contact with water. Examples of the dry method include a VMC method (Vaporized Metal Combustion Method) in which a silica particle material is prepared by burning powder made of a metal silicon in an oxidizing atmosphere gas and rapidly cooling the powder, and a melting method in which a silica particle material is obtained by putting powder made of silica into a flame to melt the powder and then rapidly cooling the melted powder. The VMC method and the melting method are each considered as a dry production method (the dry method in the present specification), since powder is put into a high-temperature atmosphere such as a flame to burn the powder, or since contact with water is avoided after the powder is heated and melted. In each of the VMC method and the melting method, the particle size distribution of a silica particle material to be prepared is controlled by adjusting the particle size distribution or amount of powder to be input. For example, if the particle diameter or amount of powder to be input is smaller, the particle diameter of a silica particle material to be prepared is also smaller.

In each of the VMC method and the melting method, the amount of water present in a space into which powder that is a raw material is to be put is preferably reduced. For example, the powder that is a raw material is dispersed in a certain dispersion medium and transported, and the water in the dispersion medium is preferably removed. In addition, the water contained in the oxidizing atmosphere gas in the VMC method or in the high-temperature atmosphere in the melting method is preferably removed. For removal of water, general dehumidification methods (condensation and removal of contained water by reducing the temperature, removal of water with a desiccant, etc.) may be employed. In addition, when the amount of water originally contained is low, the water may also be removed by performing operations such as using air that changes depending on the season and weather.

First Surface Treatment Step

The first surface treatment step is a step of performing surface treatment on the silica particle material prepared in the preparation step, to obtain a first surface treatment-processed particle material. The surface treatment is performed with a silane compound. The silane compound has a vinyl group, a phenyl group, a phenylamino group, an alkyl group having four or more carbon atoms, a methacryl group, or an epoxy group. The amount of the silane compound is not particularly limited, but may be an amount that allows all OH groups present on the surface of the silica particle material to be reacted. When the surface treatment is performed with the silane compound in an amount that leaves OH groups on the surface, a later-described second surface treatment step is preferably adopted to react all the OH groups on the surface.

The surface treatment is performed without contact with liquid water. The term "liquid water" means water in the form of a liquid on the surface of the silica particle material, and includes a liquid containing water as well as water obtained by condensing water vapor on the surface of the silica particle material. If the amount of water contained is 5000 ppm or greater (preferably 1000 ppm or greater), the liquid is determined as a liquid containing water.

In performing the surface treatment, the silane compound is directly brought into contact with the surface of the silica particle material, is brought into contact with the surface of the silica particle material after being vaporized, or is brought into contact with the surface of the silica particle material in a state of being dissolved in a certain solvent (not containing water) as a solution. During the surface treatment, heating may be performed.

Another Step (Second Surface Treatment Step)

The second surface treatment step is a step of performing surface treatment on the first surface treatment-processed particle material produced in the first surface treatment step, to obtain a second surface treatment-processed particle material. The surface treatment is performed with an organosilazane. The organosilazane is not particularly limited, but an example thereof is hexamethyldisilazane. The amount of the organosilazane for the surface treatment is preferably an amount that allows all OH groups present on the surface to be reacted.

Another Step (Heating Step)

The heating step is a step of removing the water contained in the electronic material filler by heating. Conditions for heating are set such that the amount of water after the heating step is the amount of water described for the above-described electronic material filler according to the present embodiment. In the case of a heating step to be performed in order to satisfy the value of the produced water amount 200° C. per 1 $m^2$ of surface area, heating is preferably performed at 200° C. or higher. In the case of a heating step to be performed in order to satisfy the value of the produced water amount 500° C. per 1 $m^2$ of surface area, heating is preferably performed at 500° C. or higher. The heating step may be performed at a temperature at which the silica particle material is not melted or sintered.

During the production process, heating may be performed at any time. However, in particular, heating is preferably performed at the same time as preparing the silica particle material in the preparation step. As the conditions for heating, a temperature and a time at and for which particles do not aggregate by heating may be combined. In particular, heating is performed preferably at 200° C. or higher, more preferably at 400° C. or higher, and further preferably at 500° C. The heating time is not particularly limited, but heating is preferably performed until the amount of water reaches the above-described amount of water.

A specific heating method is a method of heating using an electric furnace or a gas furnace. Specific examples of the apparatus include a rotary kiln, a fluidized bed furnace, and a firing furnace.

(Production Method for Electronic Material Filler: Part 2)

A production method for an electronic material filler according to the present embodiment includes a silica particle material production step and a drying step. The silica particle material production step is a step obtained by omitting a drying step from the preparation step in the above-described production method for an electronic material filler (Part 1). The drying step is the same as the drying step in the above-described production method for an electronic material filler (Part 1). The particle diameter or specific surface area of the produced electronic material filler is the same as that in the above-described production method for an electronic material filler (Part 1).

(Production Method for Electronic Material Resin Composition)

A production method for an electronic material resin composition according to the present embodiment includes a step of producing an electronic material filler by the above-described production method for an electronic material filler according to the present embodiment (Part 1 or Part 2), and a mixing/dispersing step of mixing and dispersing the produced electronic material filler in a resin material without contact with liquid water. The mixing ratio of the electronic material filler and the resin material in the produced electronic material resin composition is not particularly limited, but the contained amount of the electronic material filler is preferably as large as possible. For example, the electronic material filler may be mixed such that electronic material filler:resin material is about 10:90 to 90:10 as a mass ratio.

The resin material is not particularly limited, but examples thereof include general resins such as epoxy resins, polyesters, and silicone resins. The resin material has a contained amount of water of preferably 1000 ppm or less and more preferably 500 ppm or less.

The electronic material filler is preferably subjected to surface treatment. The surface treatment is preferably performed such that the affinity of the electronic material filler with the resin material to be used is improved.

High-Frequency Substrate

A high-frequency substrate according to the present embodiment may be used as a wiring substrate of an electronic device that handles high frequencies. The electronic material filler according to the present embodiment has a low Df value, and thus occurrence of loss is reduced even when the electronic material filler is put to a use in which application at a high frequency is made.

The high-frequency substrate according to the present embodiment is a cured product including the above-described electronic material filler and a resin material in which the electronic material filler is dispersed. The resin material has a contained amount of water of preferably 1000 ppm or less and more preferably 500 ppm or less.

The mixing ratio of the electronic material filler and the resin material in the high-frequency substrate is not particularly limited, but the contained amount of the electronic material filler is preferably as large as possible. For example, the electronic material filler may be mixed such that electronic material filler:resin material is about 10:90 to 90:10 as a mass ratio.

The resin material is not particularly limited, but examples thereof include general resin materials such as thermosetting resins (before or after curing) and thermoplastic resins, for example, epoxy resins, melamine resins, acrylic resins, polycarbonate resins, polyesters, silicone resins, liquid crystal polymers (LCPs), polyimides, cyclic olefin polymers (COPs), and polyphenylene oxides (PPOs). A single resin material maybe used, or a plurality of types of resin materials may be mixed (alloyed or the like) and used. The resin material has a contained amount of water of preferably 1000 ppm or less and more preferably 500 ppm or less.

The electronic material filler is preferably subjected to surface treatment. The surface treatment is preferably performed such that the affinity of the electronic material filler with the resin material to be used is improved.

Electronic Material Slurry

An electronic material slurry according to the present embodiment may be used for a semiconductor substrate material, etc. The electronic material slurry according to the present embodiment includes the above-described electronic material filler and a liquid dispersion medium in which the electronic material filler is dispersed. The dispersion medium does not substantially contain water, and particularly has a contained amount of water of preferably 1000 ppm or less and more preferably 500 ppm or less.

The mixing ratio of the electronic material filler and the dispersion medium in the electronic material slurry is not particularly limited, but the contained amount of the electronic material filler is preferably as large as possible. If the mixed amount of the electronic material filler is larger, the viscosity tends to be higher. Thus, the electronic material filler may be mixed until the viscosity reaches a viscosity that is permitted in consideration of handleability. For example, the electronic material filler may be mixed such that electronic material filler:resin material is about 20:80 to 80:20 as a mass ratio.

The dispersion medium is not particularly limited, but examples thereof include general resin precursors such as organic solvents, silicone oil, epoxy resin precursors, polyester precursors, and silicone resin precursors.

The electronic material filler is preferably subjected to surface treatment. The surface treatment is preferably performed such that the affinity of the electronic material filler with the dispersion medium to be used or a mating member that comes into contact when the electronic material filler is finally used is improved.

EXAMPLES

The electronic material filler according to the present invention is described in detail based on Examples.

(Test 1: Evaluation of Heating Temperature in Heating Step)

A silica particle material was produced by burning powder made of a metal silicon in an oxidizing atmosphere gas (VMC method: a silica particle material production step). The produced silica particle material had a volume average particle diameter of 0.3 μm and a specific surface area of 16 $m^2/g$. When "dry method" is described as a method for producing a silica particle material in Examples, a silica particle material was produced by the VMC method.

The produced silica particle material was heated at 300° C., 500° C., 700° C., 800° C., and 900° C. (heating step) to prepare samples from which contained water was removed (all the steps are a preparation step).

The obtained silica particle materials were measured for produced water amount 200° C. and produced water amount 500° C. according to the above-described methods. The unit of each amount of water in each table of the Examples is ppm. The results are shown in Table 1. Furthermore, the sample of each Test Example was measured for dielectric loss tangent at 1 GHz. The measurement of the dielectric loss tangent was performed according to JIS C 2138. Specifically, a relative permittivity and a dielectric loss tangent were measured at 1 GHz using a network analyzer (E5071C, manufactured by Keysight Technologies, Inc.) and a cavity resonator perturbation method. The measurement was performed according to ASTMD2520 (JIS C2565).

TABLE 1

|  | Test Example 1 | Test Example 2 | Test Example 3 | Test Example 4 | Test Example 5 | Test Example 6 |
| --- | --- | --- | --- | --- | --- | --- |
| Silica particle material production step | Dry method | Dry method | Dry method | Dry method | Dry method | Dry method |
| Temperature in heating step (° C.) | 0 | 300 | 500 | 700 | 800 | 900 |
| (a) Produced water amount 200° C. | 1113 | 847 | 777 | 590 | 532 | 423 |

TABLE 1-continued

|  | Test Example 1 | Test Example 2 | Test Example 3 | Test Example 4 | Test Example 5 | Test Example 6 |
|---|---|---|---|---|---|---|
| (c) Produced water amount 500° C. | 1868 | 1557 | 1373 | 1043 | 928 | 685 |
| First surface treatment | Not performed | Not performed | Not performed | Not performed | Not performed | Not performed |
| Second surface treatment | Not performed | Not performed | Not performed | Not performed | Not performed | Not performed |
| Average particle diameter (μm) | 0.3 | 0.3 | 0.3 | 0.3 | 0.3 | 0.3 |
| (b) Specific surface area (m²/g) | 16 | 16 | 16 | 16 | 16 | 16 |
| a/b | 69.6 | 52.9 | 48.6 | 36.9 | 33.3 | 26.4 |
| c/b | 116.8 | 97.3 | 85.8 | 65.2 | 58.0 | 42.8 |
| Dielectric loss tangent (1 GHz) | 0.0061 | 0.0053 | 0.0041 | 0.0029 | 0.0029 | 0.0017 |

As is obvious from Table 1, the value of the dielectric loss tangent was found to decrease when the amount of water produced at each temperature decreased. The value of the dielectric loss tangent was found to be also lower when the amount of water produced per unit area when heated at 200° C. [=(produced water amount 200° C.: ppm)÷(specific surface area: m²/g): a/b] was 40 ppm or less. In addition, the value of the dielectric loss tangent was found to be also lower when the amount of water produced per unit area when heated at 500° C. [=(produced water amount 500° C.: ppm)÷(specific surface area: m²/g): c/b] was 70 ppm or less. After the heating step, even when the sample of each Test Example was allowed to stand at normal temperature, increases in produced water amount 200° C. and produced water amount 500° C. were not observed.

(Test 2: Evaluation of Heating Temperature in Heating Step: Case of Performing Surface Treatment)

Surface treatment in two stages was performed with vinylsilane and hexamethyldisilazane (HMDS), respectively, on the samples of Test Examples 2 to 6 (a first surface treatment step and a second surface treatment step). The surface treatment with vinylsilane was performed in an amount that was about equivalent to twice the amount of surface silanol groups. In order to cause all the remaining OH groups to be reacted, the surface treatment with HMDS was performed in an amount that was equal to or larger than the amount of the first surface treatment agent, to obtain test samples of a second surface treatment-processed particle material. In tests described below, HMDS was also used as organosilazane in a second surface treatment step.

The obtained test samples (after treatment) were measured for produced water amount 200° C. and dielectric loss tangent by the methods in Test 1. The results are shown in Table 2. In Table 2, "produced water amount" at each of (a*) and (c) indicates the amount of water produced when the silica particle material before surface treatment was heated at a temperature described thereafter (the same applies hereinafter).

TABLE 2

|  | Test Example 7 | Test Example 8 | Test Example 9 | Test Example 10 | Test Example 11 |
|---|---|---|---|---|---|
| Silica particle material production step | Dry method | Dry method | Dry method | Dry method | Dry method |
| Temperature in heating step (° C.) | 300° C. | 500° C. | 700° C. | 800° C. | 900° C. |
| (a*) Produced water amount 200° C. | 847 | 777 | 590 | 532 | 423 |
| (c) Produced water amount 500° C. | 1557 | 1373 | 1043 | 928 | 685 |
| First surface treatment | Vinylsilane | Vinylsilane | Vinylsilane | Vinylsilane | Vinylsilane |
| Second surface treatment | Performed | Performed | Performed | Performed | Performed |
| Average particle diameter (μm) | 0.3 | 0.3 | 0.3 | 0.3 | 0.3 |
| (b) Specific surface area (m²/g) | 16 | 16 | 16 | 16 | 16 |
| (a) Produced water amount 200° C. (after treatment) | 541 | 625 | 541 | 508 | 444 |
| a*/b | 52.9 | 48.6 | 36.9 | 33.3 | 26.4 |
| c/b | 97.3 | 85.8 | 65.2 | 58.0 | 42.8 |
| a/b | 33.8 | 39.1 | 33.8 | 31.8 | 27.8 |
| Dielectric loss tangent (1 GHz) | 0.0013 | 0.0013 | 0.0013 | 0.0010 | 0.0010 |

As is obvious from Table 2, the value of the dielectric loss tangent was found to be made lower as compared to the test samples of Test Examples 2 to 6 before surface treatment, by performing the first surface treatment step and the second surface treatment step. The value of the dielectric loss tangent was found to be also lower when the amount of water per unit area (a/b) of the particle material after treatment was 40 ppm or less.

(Test 3: Evaluation of Silane Compound Used for Surface Treatment and Evaluation of Particle Diameter of Silica Particle Material)

Silica particle materials having a volume average particle diameter of 0.5 μm (Test Examples 12 to 16), a silica particle material having a volume average particle diameter of 0.2 μm (Test Example 17), a silica particle material having a volume average particle diameter of 0.1 μm (Test Example 18), and a silica particle material having a volume average particle diameter of 2 μm (Test Example 19) were produced by changing the production conditions of the VMC method in the silica particle material production step (preparation step). Each of the silica particle materials was heated at 800° C. as a heating step.

Similar to Test Examples 7 to 11, a first surface treatment step and a second surface treatment step were performed with vinylsilane and HMDS on Test Examples 14 and 17 to 19 to produce second surface treatment-processed particle materials as test samples of the respective Test Examples. As the first surface treatment step, surface treatment was performed with phenylaminosilane, phenylsilane, hexylsilane, and decylsilane on Test Examples 12, 13, 15, and 16, respectively. In the post-first surface treatment step, surface treatment was performed in an amount that was about equivalent to twice the amount of surface silanol groups. The obtained test samples were measured for produced water amount 200° C. and dielectric loss tangent by the methods in Test 1. The results are shown in Table 3.

TABLE 3

|  | Test Example 12 | Test Example 13 | Test Example 14 | Test Example 15 |
| --- | --- | --- | --- | --- |
| Silica particle material production step | Dry method | Dry method | Dry method | Dry method |
| Temperature in heating step (° C.) | 800° C. | 800° C. | 800° C. | 800° C. |
| (a*) Produced water amount 200° C. | 148 | 148 | 148 | 148 |
| (c) Produced water amount 500° C. | 244 | 244 | 244 | 244 |
| First surface treatment | Phenylaminosilane | Phenylsilane | Vinylsilane | Hexylsilane |
| Second surface treatment | Performed | Performed | Performed | Performed |
| Average particle diameter (μm) | 0.5 | 0.5 | 0.5 | 0.5 |
| (b) Specific surface area (m²/g) | 5 | 5 | 5 | 5 |
| (a) Produced water amount 200° C. (after treatment) | 153 | 173 | 166 | 151 |
| a*/b | 29.6 | 29.6 | 29.6 | 29.6 |
| c/b | 48.8 | 48.8 | 48.8 | 48.8 |
| a/b | 30.6 | 34.6 | 33.2 | 30.2 |
| Dielectric loss tangent (1 GHz) | 0.0009 | 0.0007 | 0.0006 | 0.0007 |

TABLE 3-continued

|  | Test Example 16 | Test Example 17 | Test Example 18 | Test Example 19 |
| --- | --- | --- | --- | --- |
| Silica particle material production step | Dry method | Dry method | Dry method | Dry method |
| Temperature in heating step (° C.) | 800° C. | 800° C. | 800° C. | 800° C. |
| (a*) Produced water amount 200° C. | 148 | 489 | 358 | 29 |
| (c) Produced water amount 500° C. | 244 | 1219 | 1860 | 377 |
| First surface treatment | Decylsilane | Vinylsilane | Vinylsilane | Vinylsilane |
| Second surface treatment | Performed | Performed | Performed | Performed |
| Average particle diameter (μm) | 0.5 | 0.2 | 0.1 | 2 |
| (b) Specific surface area (m²/g) | 5 | 20 | 30 | 2 |
| (a) Produced water amount 200° C. (after treatment) | 153 | 463 | 303 | 45 |
| a*/b | 29.6 | 24.5 | 11.9 | 14.5 |
| c/b | 48.8 | 61.0 | 62.0 | 188.5 |
| a/b | 30.6 | 23.2 | 10.1 | 22.5 |
| Dielectric loss tangent (1 GHz) | 0.0007 | 0.0013 | 0.0014 | 0.0004 |

As is obvious from Table 3, Test Example 14 in which surface treatment was performed with vinylsilane as the first surface treatment step was found to exhibit a lower value of the dielectric loss tangent as compared to Test Examples 12, 13, 15, and 16 in which surface treatment was performed with phenylaminosilane, phenylsilane, hexylsilane, and decylsilane, respectively. In addition, the value of the dielectric loss tangent was found to also increase when the specific surface area was increased as the volume average particle diameter was decreased as in the order of Test Example 19 (2 μm), Test Example 14 (0.5 μm), Test Example 10 (0.3 μm), Test Example 17 (0.2 μm), and Test Example 18 (0.1 μm). Moreover, the value of the dielectric loss tangent was found to be also lower when the amount of water per unit area (a/b) was 40 ppm or less.

(Test 4: Evaluation of Surface Treatment When Heating Step Was Not Performed)

For the samples of Test Examples 18, 17, 7, 14, and 19, surface treatment in two stages was performed with vinylsilane and hexamethyldisilazane (HMDS), respectively, on the silica particle materials before a heating step was performed (a first surface treatment step and a second surface treatment step). The surface treatment with vinylsilane was performed in an amount that was about equivalent to twice the amount of surface silanol groups. In order to cause all the remaining OH groups to be reacted, the surface treatment with HMDS was performed in an amount that was about equal to or larger than the amount of the first surface treatment agent, to obtain test samples of a second surface treatment-processed particle material.

The obtained test samples were measured for produced water amount 200° C. and dielectric loss tangent by the methods in Test 1. The results are shown in Table 4.

TABLE 4

|  | Test Example 20 | Test Example 21 | Test Example 22 | Test Example 23 | Test Example 24 |
| --- | --- | --- | --- | --- | --- |
| Silica particle material production step | Dry method | Dry method | Dry method | Dry method | Dry method |
| Temperature in heating step (° C.) | None | None | None | None | None |

TABLE 4-continued

|  | Test Example 20 | Test Example 21 | Test Example 22 | Test Example 23 | Test Example 24 |
| --- | --- | --- | --- | --- | --- |
| (a*) Produced water amount 200° C. | 2851 | 2753 | 1063 | 714 | 105 |
| (c) Produced water amount 500° C. | 3626 | 3739 | 1959 | 1219 | 462 |
| First surface treatment | Vinylsilane Performed | Vinylsilane Performed | Vinylsilane Performed | Vinylsilane Performed | Vinylsilane Performed |
| Second surface treatment | Performed | Performed | Performed | Performed | Performed |
| Average particle diameter (μm) | 0.1 | 0.2 | 0.3 | 0.5 | 2 |
| (b) Specific surface area (m$^2$/g) | 30 | 20 | 16 | 5 | 2 |
| (a) Produced water amount 200° C. (after treatment) | 345 | 625 | 584 | 173 | 56 |
| a*/b | 95.0 | 137.7 | 66.4 | 142.8 | 52.5 |
| c/b | 120.9 | 187.0 | 122.4 | 243.8 | 231.0 |
| a/b | 11.5 | 31.3 | 36.5 | 34.6 | 28.0 |
| Dielectric loss tangent (1 GHz) | 0.0015 | 0.0019 | 0.0014 | 0.0008 | 0.0004 |

As is obvious from Table 4, from comparison between Test Example 1 (the silica particle material immediately after production) and Test Example 22 (the silica particle material obtained by performing surface treatment on the sample of Test Example 1) having a volume average particle diameter of 0.3 μm, the value of the produced water amount 200° C. was found to be lower, and the value of the dielectric loss tangent was found to be also lower, by performing the first surface treatment step and the second surface treatment step. Test Example 22 had a higher value of the dielectric loss tangent than Test Examples 7 to 11 in which the heating step was performed, but had a lower value of the dielectric loss tangent than the sample of Test Example 1 and thus was found to be sufficiently excellent as an electronic material filler.

Test Examples 20, 21, 23, and 24 having volume average particle diameters of 0.1 μm, 0.2 μm, 0.5 μm, and 2 μm also have values of the dielectric loss tangent slightly higher or equal to those of Test Examples 18, 17, 14, and 19 in which the heating step was performed, and thus were found to be sufficiently excellent electronic material fillers. In addition, the value of the dielectric loss tangent was found to be also lower when the amount of water per unit area (a/b) was 40 ppm or less.

(Test 5: Evaluation of Heating Temperature in Heating Step and Value of Produced Water Amount 200° C.)

A heating step of heating at 800° C. was performed on the silica particle material having a volume average particle diameter of 0.1 μm (Test Example 25), the silica particle material having a volume average particle diameter of 0.2 μm (Test Example 26), the silica particle material having a volume average particle diameter of 0.3 μm (Test Example 27), and the silica particle material having a volume average particle diameter of 0.5 μm (Test Example 28) to obtain test samples of Test Examples 25 to 28. The value of the produced water amount 200° C. and the value of the dielectric loss tangent of each test sample are shown in Table 5.

TABLE 5

|  | Test Example 25 | Test Example 26 | Test Example 27 | Test Example 28 |
| --- | --- | --- | --- | --- |
| Silica particle material production step | Dry method | Dry method | Dry method | Dry method |
| Temperature in heating step (° C.) | 800° C. | 800° C. | 800° C. | 800° C. |
| (a) Produced water amount 200° C. | 358 | 489 | 532 | 148 |
| (c) Produced water amount 500° C. | 1860 | 1219 | 928 | 244 |
| First surface treatment | Not performed | Not performed | Not performed | Not performed |
| Second surface treatment | Not performed | Not performed | Not performed | Not performed |
| Average particle diameter (μm) | 0.1 | 0.2 | 0.3 | 0.5 |
| (b) Specific surface area (m$^2$/g) | 30 | 20 | 16 | 5 |
| a/b | 11.9 | 24.5 | 33.3 | 29.6 |
| c/b | 62.0 | 61.0 | 58.0 | 48.8 |
| Dielectric loss tangent (1 GHz) | 0.0036 | 0.0028 | 0.0029 | 0.0011 |

As is obvious from Table 5, water was sufficiently removed by adopting the heating step at a high temperature of 800° C., so that the value of the dielectric loss tangent was decreased. The value of the amount of water per unit area (a/b) was 40 ppm or less.

(Test 6: Evaluation of Second Surface Treatment Step)

As a first surface treatment step, surface treatment with vinylsilane was additionally performed on the test samples of Test Examples 25 to 28 evaluated in Test 5, to obtain test samples of Test Examples 29 to 32. The amount of vinylsilane was determined by an amount that was equivalent to twice the amount of surface silanol groups. The results are shown in Table 6.

TABLE 6

|  | Test Example 29 | Test Example 30 | Test Example 31 | Test Example 32 |
| --- | --- | --- | --- | --- |
| Silica particle material production step | Dry method | Dry method | Dry method | Dry method |
| Temperature in heating step (° C.) | 800° C. | 800° C. | 800° C. | 800° C. |
| (a*) Produced water amount 200° C. | 358 | 489 | 532 | 148 |

TABLE 6-continued

|  | Test Example 29 | Test Example 30 | Test Example 31 | Test Example 32 |
|---|---|---|---|---|
| (c) Produced water amount 500° C. | 1860 | 1219 | 928 | 244 |
| First surface treatment | Vinyl-silane | Vinyl-silane | Vinyl-silane | Vinyl-silane |
| Second surface treatment | Not performed | Not performed | Not performed | Not performed |
| Average particle diameter (μm) | 0.1 | 0.2 | 0.3 | 0.5 |
| (b) Specific surface area (m$^2$/g) | 30 | 20 | 16 | 5 |
| (a) Produced water amount 200° C. (after treatment) | 90 | 372 | 375 | 197 |
| a*/b | 11.9 | 24.5 | 33.3 | 29.6 |
| c/b | 62.0 | 61.0 | 58.0 | 48.8 |
| a/b | 3.0 | 18.6 | 23.4 | 39.4 |
| Dielectric loss tangent (1 GHz) | 0.0017 | 0.0015 | 0.0013 | 0.0008 |

As is obvious from Tables 5 and 6, the value of a/b was found to be made lower than the value (a*/b) before performing the first surface treatment step, by performing the surface treatment with vinylsilane when the specific surface area was large (larger than 5 m$^2$/g: Test Examples 29 to 31), and the value of the dielectric loss tangent was further found to be lower. Even for the test sample of Test Example 32 in which the specific surface area was small and the value of a/b was not lower, the value of the dielectric loss tangent was lower.

(Test 7: Evaluation of Bringing Into Contact With Water)

A silica particle material having a volume average particle diameter of 0.1 μm (Test Example 33) and a silica particle material having a volume average particle diameter of 0.5 μm (Test Example 34) were produced by a wet method (sol-gel method), and surface treatment was then performed with a surface treatment agent containing vinylsilane and water (a first surface treatment step). Thereafter, a second surface treatment step was performed with a surface treatment agent containing HMDS and water, to obtain test samples.

Moreover, a silica particle material having a volume average particle diameter of 0.3 μm was prepared by a dry method, and then a first surface treatment step (containing water) and a second surface treatment step that were the same as those for Test Examples 31 and 32 were performed to obtain a test sample of Test Example 35. Furthermore, a silica particle material having a volume average particle diameter of 0.3 μm was prepared by a dry method, and then a first surface treatment step (not containing water) that was the same as that for Test Example 7 and a second surface treatment step that was the same as that for Test Examples 33 and 34 were performed to obtain a test sample of Test Example 36. The results are shown in Table 7.

TABLE 7

|  | Test Example 33 | Test Example 34 | Test Example 35 | Test Example 36 |
|---|---|---|---|---|
| Silica particle material production step | Wet method | Wet method | Dry method | Dry method |
| Temperature in heating step (° C.) | None | None | 800° C. | 800° C. |
| (a*) Produced water amount 200° C. | — | — | 532 | 532 |
| (c) Produced water amount 500° C. | — | — | 928 | 928 |
| First surface treatment | Wet vinylsilane treatment | Wet vinylsilane treatment | Wet vinylsilane treatment | Vinyl-silane |
| Second surface treatment | Wet treatment | Wet treatment | Wet treatment | Wet treatment |
| Average particle diameter (μm) | 0.1 | 0.5 | 0.3 | 0.3 |
| (b) Specific surface area (m$^2$/g) | 30 | 5 | 16 | 16 |
| (a) Produced water amount 200° C. (after treatment) | 7600 | 7863 | 2201 | 7890 |
| a*/b | — | — | 33.3 | 33.3 |
| c/b | — | — | 58.0 | 58.0 |
| a/b | 253.3 | 1572.6 | 137.6 | 493.1 |
| Dielectric loss tangent (1 GHz) | 0.0441 | 0.0980 | 0.0049 | 0.0100 |

Since Test Examples 33 to 36 were brought into contact with liquid water at any of the stages, the value of the dielectric loss tangent was found to be a very high value. In addition, the value of a/b was a value much higher than 40 ppm. Furthermore, for Test Examples 33 and 34 in which the value of the amount of water per unit area (a*/b) before wet surface treatment was performed in either one of the first and second surface treatment steps was 40 ppm or less, the amount of water was increased by performing the wet treatment, and thus the value of the dielectric loss tangent was also increased.

The invention claimed is:

1. A method for producing an electronic material filler, comprising:
   preparing a silica particle material by a dry method, and drying the silica particle material;
   performing a first surface treatment on the dried silica particle material with a silane compound having a vinyl group, a phenyl group, a phenylamino group, an alkyl group having four or more carbon atoms, a methacryl group, or an epoxy group, to obtain a first surface treatment-processed particle material; and
   performing a second surface treatment on the first surface treatment-processed particle material with organosilazane, to obtain a second surface treatment-processed particle material,
   wherein
   after the silica particle material is prepared, the silica particle material is not brought into contact with liquid water,
   the silica particle material has a particle diameter of 100 nm to 600 nm and a specific surface area of 5 m$^2$/g to 35 m$^2$/g,
   an amount of the organosilazane used in the second surface treatment is equal to or greater than an amount of functional groups that remain on a surface of the first surface treatment-processed particle material and that are capable of reacting with the organosilazane,
   the second surface treatment is performed such that no OH groups is left on a surface of the second surface treatment-processed particle material, and when the dried silica particle material is heated at 500° C., 70 ppm or less of water is generated per 1 $m^2$ of the surface area of the dried silica particle material.

2. A method for producing an electronic material resin composition, comprising:
producing an electronic material filler by the method according to claim 1; and
mixing and dispersing the electronic material filler in a resin material without bringing the electronic material filler into contact with liquid water.

3. The method according to claim 2, wherein the resin material has a water content of 1000 ppm or less.

4. A method for producing an electronic material filler, comprising:
preparing a silica particle material by a dry method, and drying the silica particle material; and
performing a first surface treatment on the dried silica particle material with a silane compound having a vinyl group, a phenyl group, a phenylamino group, an alkyl group having four or more carbon atoms, a methacryl group, or an epoxy group, to obtain a first surface treatment-processed particle material,
wherein after the silica particle material is prepared, the silica particle material is not brought into contact with liquid water,
the silica particle material has a particle diameter of 100 nm to 600 nm and a specific surface area of 5 $m^2$/g to 35 $m^2$/g,
when the dried silica particle material is heated at 200° C., 40 ppm or less of water is generated per 1 $m^2$ of a surface area of the dried silica particle material, and
when the dried silica particle material is heated at 500° C., 70 ppm or less of water is generated per 1 $m^2$ of the surface area of the dried silica particle material.

5. A method for producing an electronic material resin composition, comprising:
producing an electronic material filler by the method according to claim 4; and
mixing and dispersing the electronic material filler in a resin material without bringing the electronic material filler into contact with liquid water.

6. The method according to claim 5, wherein the resin material has a water content of 1000 ppm or less.

7. A method for producing an electronic material filler, comprising:
producing a silica particle material by a dry method; and
after the producing of the silica particle material, heating and drying the silica particle material to obtain a dried silica particle material,
wherein
when the dried silica particle material is heated at 200° C., 40 ppm or less of water is generated per 1 $m^2$ of a surface area of the dried silica particle material,
when the dried silica particle material is heated at 500° C., 70 ppm or less of water is generated per 1 $m^2$ of the surface area of the dried silica particle material,
after the silica particle material is produced by the dry method, the silica particle material is not brought into contact with liquid water, and
the silica particle material has a particle diameter of 100 nm to 600 nm and a specific surface area of 5 $m^2$/g to 35 $m^2$/g.

8. A method for producing an electronic material resin composition, comprising:
producing an electronic material filler by the method according to claim 7; and
mixing and dispersing the electronic material filler in a resin material without bringing the electronic material filler into contact with liquid water.

9. The method according to claim 8, wherein the resin material has a water content of 1000 ppm or less.

10. The method according to claim 7, wherein the heating and drying are performed in an electric furnace or a gas furnace.

* * * * *